April 25, 1950

H. C. HEWITT ET AL 2,505,243

DOUGHNUT MAKING MACHINE

Filed Dec. 22, 1945

INVENTORS
Harold C. Hewitt
Franklin H. Morgan

BY Barnes, Kisselle, Laughlin & Raisch
ATTORNEYS

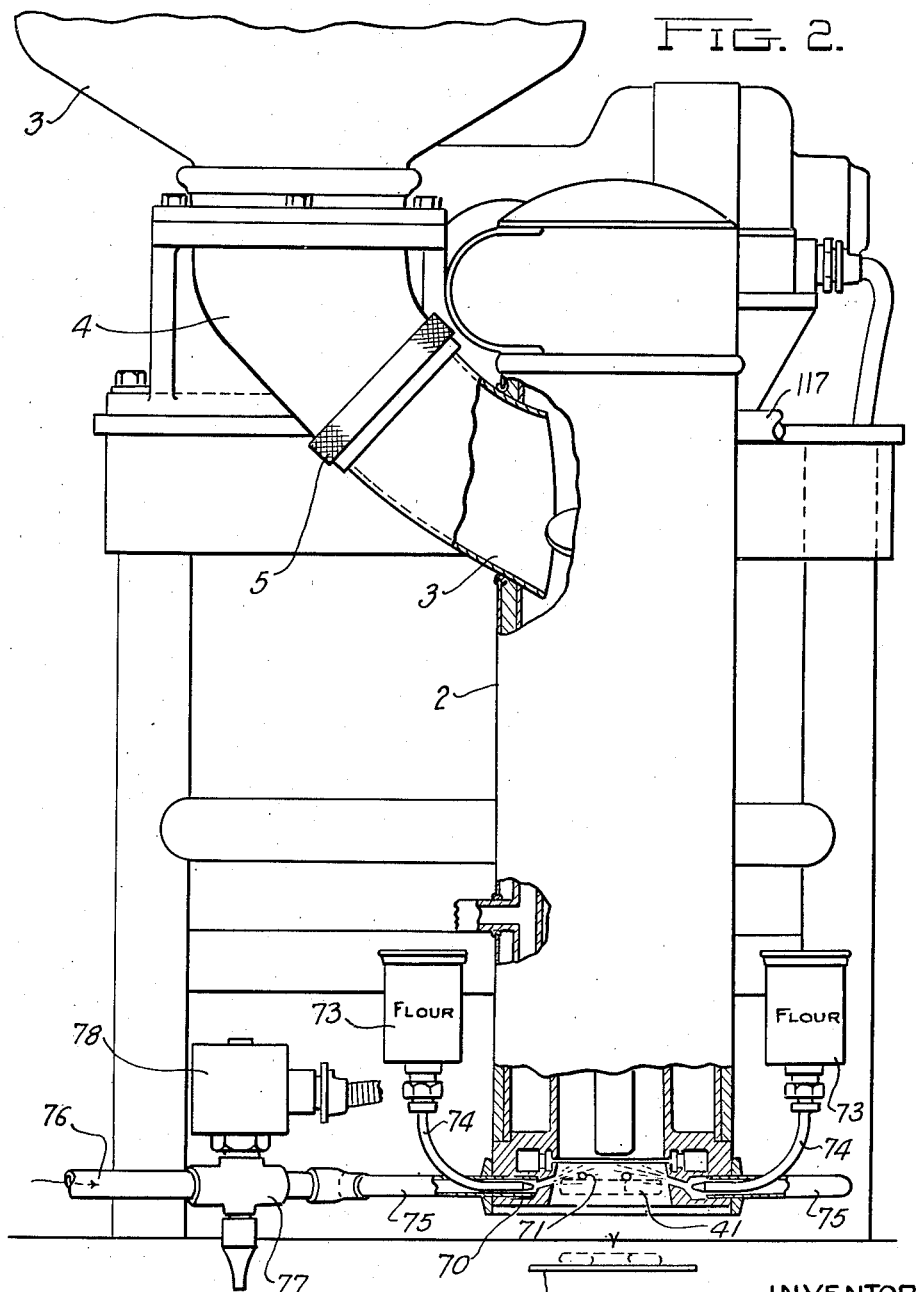

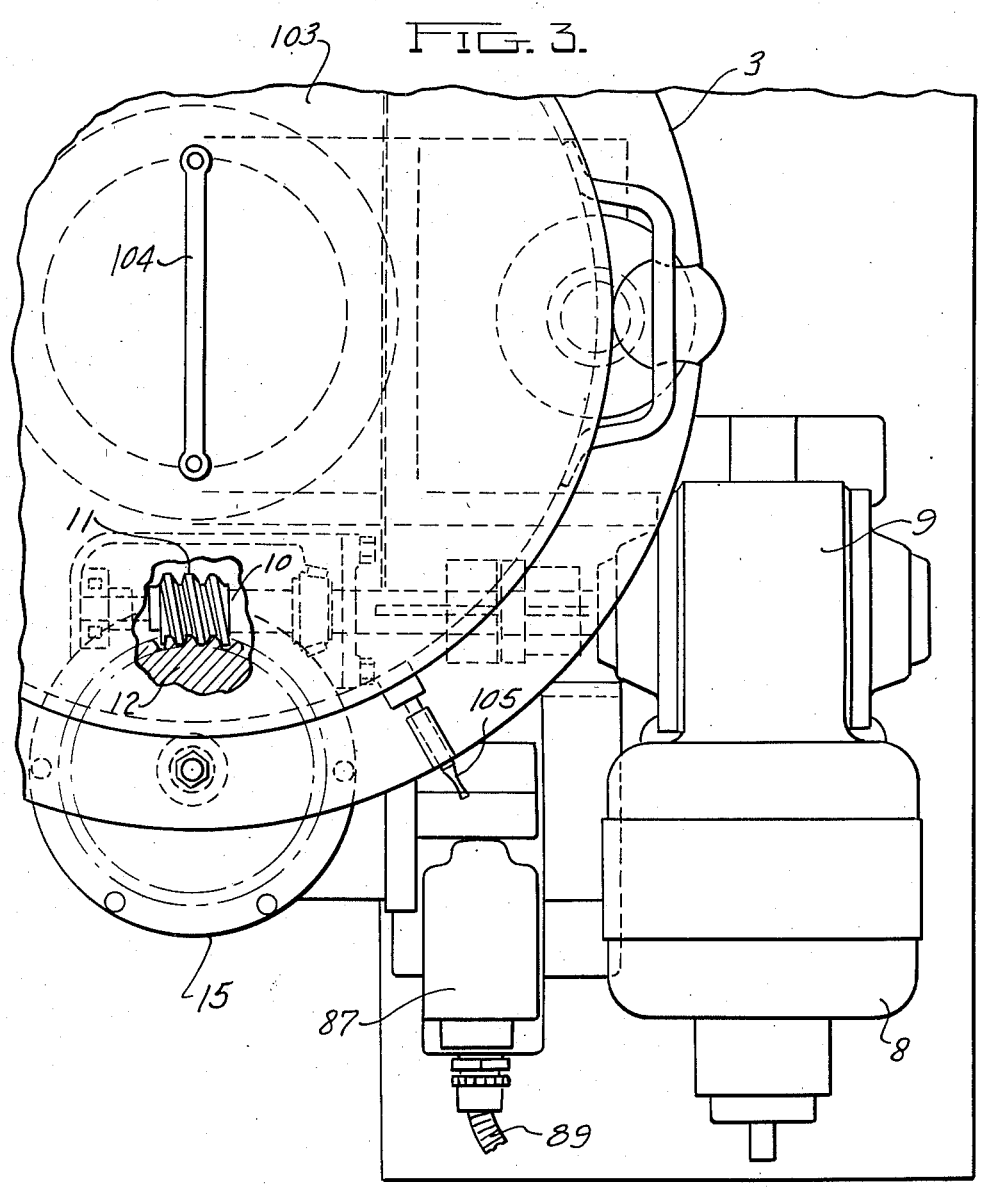

April 25, 1950  H. C. HEWITT ET AL  2,505,243
DOUGHNUT MAKING MACHINE
Filed Dec. 22, 1945  4 Sheets—Sheet 4
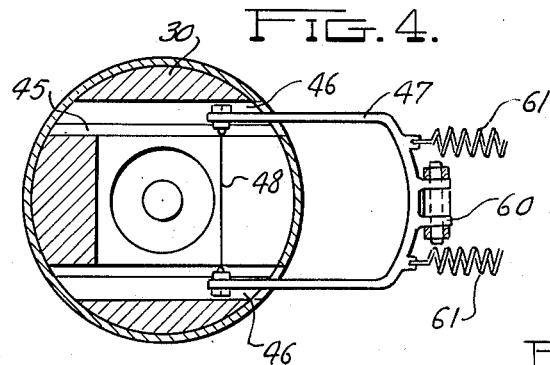
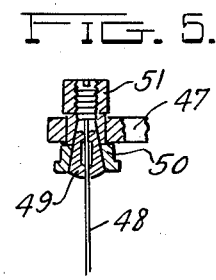
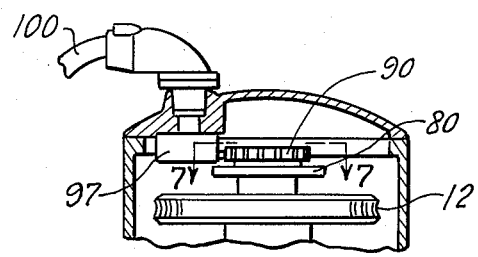
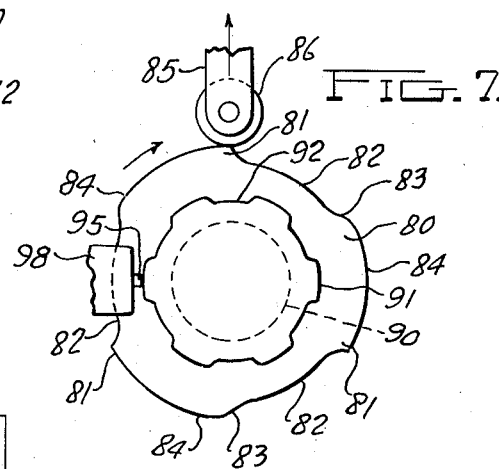
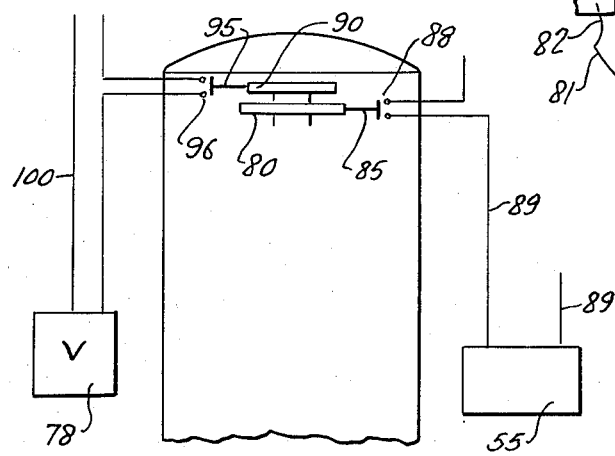
INVENTORS
Harold C. Hewitt
Franklin H. Morgan
BY Barnes, Kisselle, Laughlin, Raisch
ATTORNEYS Patented Apr. 25, 1950

2,505,243

UNITED STATES PATENT OFFICE 2,505,243

DOUGHNUT MAKING MACHINE

Harold C. Hewitt, Detroit, and Franklin H. Morgan, Grosse Pointe Woods, Mich., assignors to William Stern, Detroit, Mich.

Application December 22, 1945, Serial No. 636,896

2 Claims. (Cl. 107—14)

This invention relates to an apparatus for making an edible article commonly known as a doughnut.

As is well known, a doughnut is a cooked product, usually cooked in deep fat and is usually of circular form with a hole in the center. A similar article is what is commonly called a fried cake; the two articles are similar in that they usually have the same geometric shape.

There is a distinct difference, however, between a doughnut and a fried cake and the difference in the material or dough of which the two articles are made and the difference in the manner of preparation and handling. Generally speaking, a fried cake is made of a dough or batter similar to cake dough and the dough is quite fluid so that in many instances it may be caused to flow, even by gravity, from a suitable outlet of a vessel. Contrary to this, however, a doughnut is made of a sweet yeast dough, more in the nature of a bread dough. The dough is first prepared and then must be aged so that there is a fermentation before it is prepared. This dough is compact and quite viscous and difficult to handle. After the dough has been properly aged to promote the fermentation the dough is handled and formed into the doughnut shaped article and due to the nature and consistency of the dough, a machine or apparatus for handling the same involves a rather intricate mechanism. After the shaped articles are formed of the dough by the apparatus constituting this invention, the articles are allowed to raise for a period before being cooked by immersion in the deep fat.

The overall general object of this invention is to provide an apparatus for handling the dough and forming the shaped articles therefrom on a commercial basis so that the doughnuts may be turned out by the machine in quantities. Other objects and advantages will become apparent as the detailed description is followed in conjunction with the accompanying drawings which show an apparatus constructed in accordance with the invention.

Fig. 2 is a side elevational view looking at right angles to Fig. 1 and illustrating parts cut away, and parts in section for showing structural features.

Fig. 3 is a top plan view of parts cut away showing some of the mechanism.

Fig. 4 is a sectional view taken substantially on line 4—4 of Fig. 1 showing the cutting mechanism.

Fig. 5 is a detailed view largely in section showing the mounting for the cutting wire.

Fig. 6 is a sectional view taken substantially on line 6—6 of Fig. 1 showing some of the operating and controlling mechanism.

Fig. 7 is an enlarged view taken on line 7—7 of Fig. 6 illustrating some of the operating and controlling mechanism.

Fig. 8 is a diagrammatic view illustrating the electrical connections.

Figure 1:
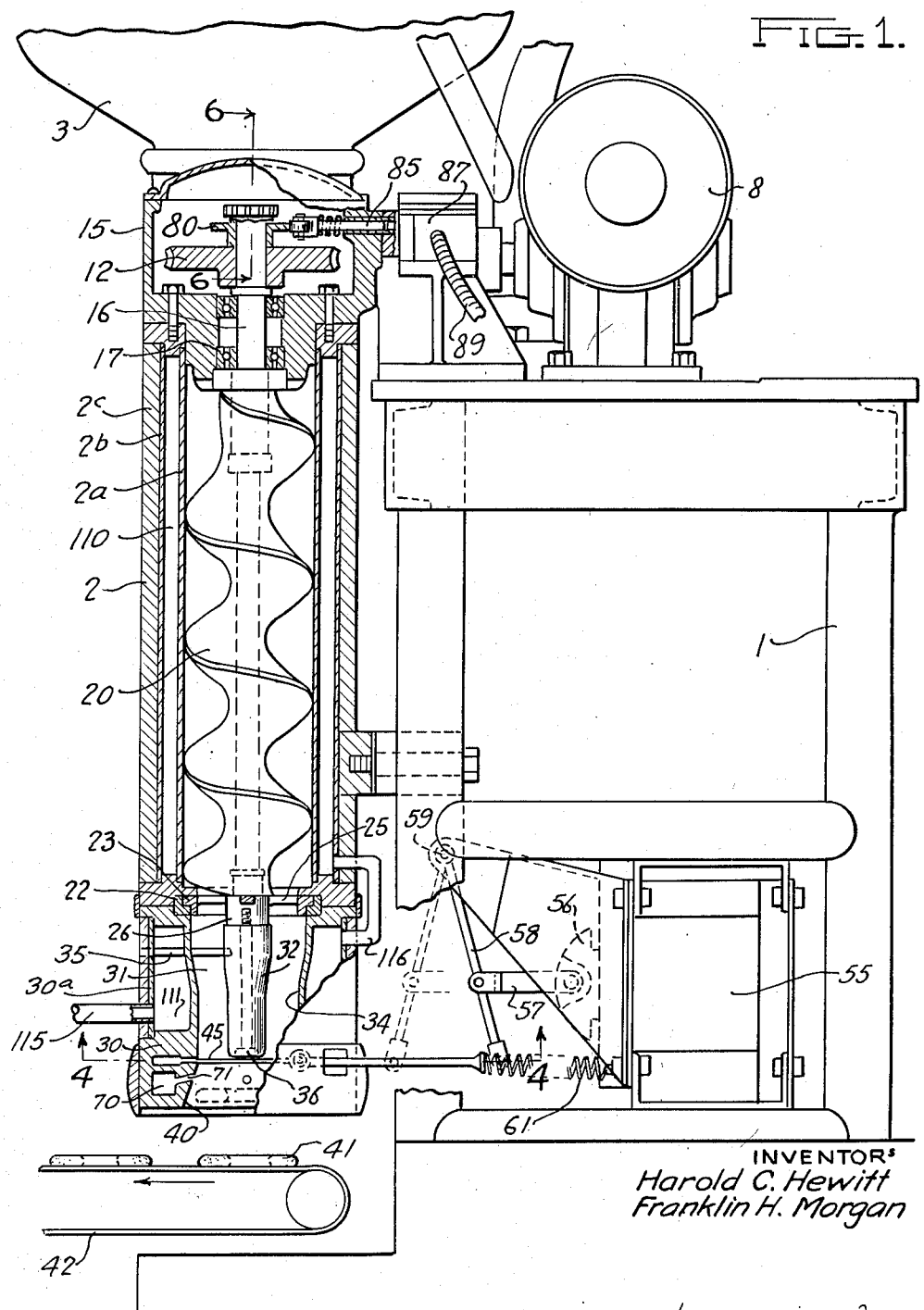
Fig. 1 is a view partly in side elevation and partly in vertical section illustrating an apparatus constructed in accordance with the invention.

In Fig. 1 a supporting frame is generally illustrated at 1 positioned along side of which, in a vertical position, is a cylinder 2. A hopper or vat 3 is designed to receive the dough and this vat has an outlet 4 which extends into the upper portion of the cylinder 2 as illustrated at 3. The outlet tube or pipe may have a suitable coupling 5 therein.

Positioned on the support 1 is a suitable driving motor 8 which drives through a gear box 9 to rotate a driving shaft 10 upon which is a worm 11 for rotating a worm gear 12 which will be seen at the top of the cylinder 2 as shown in Fig. 1. In fact the worm gear is mounted in a housing 15 at the top of the cylinder and journalled in the housing is a shaft 16 preferably mounted on anti-friction bearings 17.

There is a screw 20 positioned within the cylinder which is turned by the shaft 16. This screw extends substantially the length of the cylinder. At the lower or outlet end of the cylinder is a bearing ring 22 and operating in this bearing ring is the ring portion 23 of a spider-like arrangement having spokes 25 connecting the ring portion 23 and a hub 26 and the hub is secured to the lower end of the shaft or screw so as to rotate therewith. There is an outlet fixture 30 secured to the lower end of the cylinder arranged to provide an outlet passageway 31, while on the lower end of the shaft or screw is a central piece or plug 32. This plug may be of wood, such as maple or the like, and which may be soaked with oil to minimize sticking of the dough thereon and the walls of the outlet 31 and the shape of the plug are such as to provide a slight restriction in the outlet passage. To this end the walls defining the passage 31 are inclined inwardly, as shown at 34, and the plug may be of generally similar shape. The plug 32 is preferably held against rotation as by means of a pin 35 and it is rotatably held by a shoulder screw 36.

As will presently be seen the formed article is dropped or ejected from the outlet passage 40, the formed articles being shown at 41 and they may fall upon a suitable conveyer or other device as shown at 42.

Suitable severing means is provided, as shown in Figs. 1 and 4. The outlet fixture 30 is provided with a slot 45 with passageways 46 on opposite sides thereof and reciprocable in the passageways are the arms of a yoke 47 and stretched taut between the arms is a cutting wire 48. As shown in Fig. 5, the ends of the cutting wire are gripped by a split plug 49 clamped by a bushing 50 which may be tightened by a nut 51. The means for reciprocating the cutting wire is preferably an electrical operator in the form of a solenoid 55 whose armature 56 is connected by a link 57 to an arm 58 pivoted as at 59 and connected to the yoke at 60. Springs 61 connect to the yoke, as shown in Fig. 4, and are anchored to a fixed part as shown in Fig. 1 for acting in opposition to movement of the solenoid. The two positions are shown in Fig. 1, with one position being in dotted lines.

Means are provided preferably to dust the formed articles with flour and this is shown in Fig. 2. The outlet fixture 30 is formed with a chamber 70 from which a plurality of ports 71 extend, these ports extending through the inner wall as illustrated. As shown in Fig. 2 there are two vessels 73 for containing flour with outlet tubes 74 leading therefrom and advantageously there is a flour container on opposite sides. The tubes 74 extend into the passage 70 and into air supply tubes 75. Air under pressure is supplied from a supply pipe 76 and in this pipe is a valve 77 electrically controlled to be opened and closed by a magnet or solenoid 78. When air is supplied it is forced into the chamber 70 and the action draws in flour and sprays the same through the several openings 71 into the outlet passage 40. As illustrated in Fig. 2, the flour is sprayed over the severed article 41 and on the under side of the mass of dough above the same in the cylinder.

Preferably operating from the shaft 16 is a suitably timed controlling mechanism and it includes a cam 80. As shown in Fig. 7 this cam has three high spots 81, next to each of which is a dwell portion 82 and three lifts 83 and high surfaces 84 leading to the high points 81. Operating on this cam is a spring pressed plunger 85 preferably with a contacting roller 86 for operating an electrical switch 88 generally indicated in a box or container 87. The electrical conductors 89 extend to the solenoid 55 and are shown in Fig. 1 as being protected or insulated in a suitable conduit.

Also on the shaft 16 is a cam 90 with six high spots 91 and intervening dwells 92 for operating the plunger 95 of a switch 96 in a box 98. The electrical conductors 100 associated with a switch 96 extend to the solenoid 78 for controlling the valve 77. These conductors are shown as insulated or in a conduit in Fig. 6.

The top of the vat 3 is provided with a suitable cover 103 which may have a handle 104 and which may be held in position by a suitable number of holding devices or latches 105.

The cylinder is preferably constructed to provide a jacket for the introduction of a cooling medium. This preferably also applies to the outlet fixture. To this end, the cylinder has an inner jacket 2a and an outer jacket 2b with preferably an outer layer of insulation 2c thus providing a space 110. The outlet piece 30 is so formed and fitted with an outer wall 30a as to provide an internal space 111. A cooling medium, such as water, may be introduced through a supply conduit 115 and from the space 111 cooling water may flow through conduit 116 into the space 110 and the cooling water may exhaust through outlet passage 117 near the top of the cylinder.

In the operation of the device the dough, bearing in mind that it is a dough of the type generally referred to as a sweet yeast dough, and which is quite viscous and compact and which resists flow, after being properly aged, is placed in the vat or vessel 3 and the machine set into operation. The dough moves down through the tube 3 and into the upper end of the cylinder and by the action of the screw is moved downwardly through the cylinder. The dough is relatively compacted in the cylinder by the screw and as it is moved downwardly there is a reduction in pressure in the inlet tube 3 which may be referred to as suction and the atmospheric pressure on the surface of the dough in the vat 3 aids in the movement of the dough through the tube 3 and into the cylinder.

Upon each revolution of the screw there is a functioning of the cut off knife and of the dusting apparatus. As shown in Fig. 7 the follower 86 has just moved up on a high point 81 and this action closes the switch 88 energizing the solenoid 55 and the armature 56 is projected thus moving the cutting wire across the outlet to the left. The moved position is shown in dotted lines in Fig. 1. This tensions the springs 61. Upon continued rotation of the cam clockwise as Fig. 7 is viewed, the follower eventually moves down one of the lifts 83 thus opening the switch 88 and de-energizing the solenoid. The springs 61 now pull the cutter wire back across the outlet opening. With the cam as constructed in Fig. 7 there are six of such cuts made in one revolution of the shaft. The dough is moved downwardly in the cylinder and it passes the rotating spider 23 and is formed in doughnut fashion by the spud 32, and upon each traversing of the wire some of the dough is severed from the body thus forming the articles 41.

Operating in timed relation to the severing action is the dusting function controlled by the cam 90. Immediately following each cutting action, one of the high points 91 causes a closing of the switch 95 thus energizing the solenoid 78 which opens the valve 77 so that a blast of air is momentarily caused to enter the chamber 70. This blows the flour over the severed article as shown in Fig. 2 and, in fact, dusts the underside of the body of dough remaining in the cylinder just above the cut. Of course, the timing arrangement is subject to variation as this all depends upon the inter-relationship of the rate of feed of the screw and the size of the articles desired.

The dough is, in effect, extruded from the device with the articles being successively severed therefrom as the dough progresses. The cooling of the cylinder sets up a chilling action particularly where the dough contacts with the walls of the cylinder. This causes some condensation of moisture in the warm, moist dough without changing the composition of the dough. The moisture thus forming within the cylinder acts, in effect, as a lubricant and minimizes the friction of the dough against the side walls and in turn reduces the compression necessary to force the dough through the cylinder. The principle of extruding and severing the dough to form shaped edible articles may be employed with articles shaped other than that of the well-known doughnut. The dusting of the formed articles with flour facilitates the later handling of the articles in that it prevents them from sticking to the conveyer or other receiving means. And as explained above, after the severed articles have been allowed the requisite period for raising they are dropped into deep fat for cooking. The chilling action on the dough as it moves through the jacketed cylinder preserves the carbonic gas in that it prevents the gas from escaping. The carbonic gas which may tend to escape from the dough is dissolved in the cooled water content of the dough. From this standpoint, it is preferable to chill the dough to a temperature of about 78° F. because above a temperature in this vicinity there is a tendency for the carbonic gas to escape. The preserving of the carbonic gas is desirable and even essential for the raising or expansion of the dough after the articles are formed. This raising takes place in the time period between the forming of the article and the cooking of the article and this is preferably done in what is known as a proofing oven, where the articles are subjected to a heat of approximately 90° F. depending upon room temperature conditions.

We claim:

1. An apparatus for forming an edible article such as a doughnut from a viscous, compact dough which comprises, a cylinder, supply means for feeding the dough into one end of the cylinder, a screw in the cylinder operable to feed the dough through the cylinder, the opposite end of the cylinder having an outlet, a cutter wire mounted for reciprocation in a direction transversely of its length across the cylinder adjacent the outlet and means operating in timed relationship with the operating of the screw for reciprocating the cutter at spaced intervals back and forth across the outlet to cut an article from the advancing dough in each stroke of the reciprocating movement, and a plug of oiled wood extending from the end of the screw and into the outlet for forming an aperture in the edible article.

2. An apparatus for forming an edible article such as a doughnut from a relatively viscous, compact dough which comprises a substantially vertically disposed cylinder, means for feeding the dough into the upper end of the cylinder, feeding means in the cylinder operable to feed the dough downwardly through the cylinder, the lower end of the cylinder having an outlet, a cutter mounted for reciprocation across the cylinder adjacent the outlet and means operating in timed relationship to the operation of the said feeding means for reciprocating the cutter at spaced time intervals back and forth across the outlet to cut an article from the advancing dough in each stroke of the reciprocable movement so that the severed article falls from the outlet, a manifold-type hollow fixture having a chamber and extending about the outlet in a position below the cutter and having a passage aligned with said outlet and through which the severed article falls, said fixture having a plurality of apertures communicating with said chamber and said passage so that air may pass from the chamber through the apertures into the passage, means for supplying flour to the chamber, air pressure means for introducing air into the chamber to inject the flour through said apertures and into the passage, said air pressure means including an air controlling valve means operating in timed relationship to the operation of the cutter for introducing air into said chamber in successive blasts.

HAROLD C. HEWITT.
FRANKLIN H. MORGAN.

REFERENCES CITED

The following references are of record in the file of this patent:

UNITED STATES PATENTS

| Number | Name | Date |
| --- | --- | --- |
| 903,584 | Kohler | Nov. 10, 1908 |
| 1,265,854 | Wixey | May 14, 1918 |
| 1,881,171 | Cooley | Oct. 4, 1932 |
| 2,099,900 | Maier | Nov. 23, 1937 |
| 2,291,457 | Farmer | July 28, 1942 |
| 2,317,897 | Ellis | Apr. 27, 1943 |

FOREIGN PATENTS

| Number | Country | Date |
| --- | --- | --- |
| 5,825 | Great Britain | Mar. 18, 1893 |